US009920541B2

(12) United States Patent
Erath et al.

(10) Patent No.: US 9,920,541 B2
(45) Date of Patent: Mar. 20, 2018

(54) SCAFFOLDING PIPE OF A STRUCTURAL SCAFFOLDING SYSTEM AND SCAFFOLDING ELEMENT

(71) Applicant: Peri GmbH, Weissenhorn (DE)

(72) Inventors: Frank Erath, Dornstadt (DE); Christian Leder, Bibertal/Buehl (DE); Rudolf Specht, Neu-Ulm (DE)

(73) Assignee: PERI GmbH, Weissenhorn (DE)

( * ) Notice: Subject to any disclaimer, the term of this patent is extended or adjusted under 35 U.S.C. 154(b) by 0 days.

(21) Appl. No.: 15/000,330

(22) Filed: Jan. 19, 2016

(65) Prior Publication Data

US 2016/0153205 A1     Jun. 2, 2016

Related U.S. Application Data

(63) Continuation of application No. PCT/EP2014/065753, filed on Jul. 22, 2014.

(30) Foreign Application Priority Data

Aug. 2, 2013   (DE) ................. 10 2013 108 326

(51) Int. Cl.
  *F16L 13/00*    (2006.01)
  *E04G 7/20*     (2006.01)
  (Continued)

(52) U.S. Cl.
  CPC .............. *E04G 7/301* (2013.01); *E04G 1/06* (2013.01); *E04G 1/14* (2013.01); *E04G 7/20* (2013.01);
  (Continued)

(58) Field of Classification Search
  CPC ....... F16L 1/00; F16L 9/00; F16L 9/02; F16L 13/007; F16L 13/00
  See application file for complete search history.

(56) References Cited

U.S. PATENT DOCUMENTS

| 1,590,357 A * | 6/1926 | Feisthamel | ........... E21B 17/042 |
| | | | 285/332.1 |
| 2,509,363 A * | 5/1950 | Page | ..................... F16L 15/001 |
| | | | 277/607 |

(Continued)

FOREIGN PATENT DOCUMENTS

| CH | 671 814 A5 | 9/1989 |
| DE | 966 298 C | 7/1957 |

(Continued)

*Primary Examiner* — Phi Dieu Tran A
(74) *Attorney, Agent, or Firm* — Hackler Daghighian Martino & Novak (57) ABSTRACT

A scaffolding pipe of a structural scaffolding system extends from a first axial pipe end to an opposing second axial pipe end. A receiving portion is provided on the first axial pipe end and an insertion portion is provided on the second axial pipe end. The insertion portion has a reduced cross-section compared with the receiving portion and terminates with a radial shoulder which forms a support face. The receiving portion inner diameter is greater than the insertion portion outer diameter. The receiving portion at the first axial pipe end has one positioning groove which is interrupted or continuous in a peripheral direction which reduces the inner diameter of the receiving portion and which defines the minimum inner diameter of the receiving portion. A pipe wall of the scaffolding pipe has at the first axial pipe end a maximum wall thickness greater than the otherwise smaller wall thickness.

22 Claims, 3 Drawing Sheets

(51) Int. Cl.
*E04G 7/30* (2006.01)
*E04G 1/06* (2006.01)
*E04G 1/14* (2006.01)
*F16L 19/02* (2006.01)
*F16L 13/04* (2006.01)
*F16L 19/025* (2006.01)
*F16L 13/16* (2006.01)

(52) U.S. Cl.
CPC ............... *E04G 7/30* (2013.01); *F16L 13/04* (2013.01); *F16L 13/16* (2013.01); *F16L 19/02* (2013.01); *F16L 19/025* (2013.01)

(56) References Cited

U.S. PATENT DOCUMENTS

| | | | | |
|---|---|---|---|---|
| 3,068,563 A * | 12/1962 | Reverman | B21D 39/04 | 156/91 |
| 3,307,860 A * | 3/1967 | Blount | E21B 17/042 | 285/334 |
| 3,353,563 A * | 11/1967 | Hutton | F16L 25/03 | 138/39 |
| 3,503,636 A * | 3/1970 | Bower | F16L 21/02 | 285/305 |
| 3,508,771 A * | 4/1970 | Duret | E21B 17/042 | 285/334 |
| 3,759,554 A * | 9/1973 | Carter | F16L 13/161 | 285/260 |
| 3,784,235 A * | 1/1974 | Kessler | B29C 65/5057 | 156/294 |
| 4,240,652 A * | 12/1980 | Wong | E21B 17/00 | 285/333 |
| 4,244,607 A * | 1/1981 | Blose | E21B 17/0423 | 285/334 |
| 4,406,485 A * | 9/1983 | Giebeler | E21B 33/13 | 285/391 |
| 4,541,655 A * | 9/1985 | Hunter | B21D 39/04 | 285/382.2 |
| 4,548,430 A * | 10/1985 | Haubert | F16L 33/2078 | 285/256 |
| 4,610,465 A * | 9/1986 | Boyadjieff | E02B 17/00 | 285/18 |
| 4,648,627 A * | 3/1987 | Reimert | E21B 17/04 | 285/24 |
| 5,015,014 A * | 5/1991 | Sweeney | F16L 47/12 | 285/328 |
| 5,069,309 A * | 12/1991 | Swiderski | E04G 1/20 | 16/30 |
| 5,176,409 A * | 1/1993 | Brooks | F16L 17/08 | 285/334.4 |
| 5,251,942 A * | 10/1993 | Whaley | F16L 15/009 | 285/355 |
| 5,799,703 A * | 9/1998 | Kanao | F16L 9/003 | 138/115 |
| 5,810,401 A * | 9/1998 | Mosing | E21B 17/0426 | 285/333 |
| 6,120,067 A * | 9/2000 | Mosing | F16L 15/008 | 285/331 |
| 6,338,507 B1 * | 1/2002 | Amatsutsu | F16L 25/0045 | 138/121 |
| 6,860,514 B2 * | 3/2005 | Wentworth | E21B 17/04 | 285/333 |
| 6,990,719 B2 * | 1/2006 | Olivier | E21B 17/042 | 29/428 |
| 7,401,820 B2 * | 7/2008 | Niki | F16L 37/088 | 285/305 |
| 9,109,370 B2 | 8/2015 | Kreller | | |
| 9,238,946 B2 * | 1/2016 | Mageren | | |
| 9,689,211 B2 * | 6/2017 | Joensen | | |
| 2004/0135369 A1 * | 7/2004 | Schroter | F16L 25/0045 | 285/305 |
| 2005/0116468 A1 * | 6/2005 | Otten | F16L 15/004 | 285/90 |
| 2015/0323109 A1 * | 11/2015 | Dupal | E21B 19/16 | 285/91 |

FOREIGN PATENT DOCUMENTS

| | | |
|---|---|---|
| DE | 6928808 | 11/1969 |
| DE | 195 33 110 A1 | 3/1997 |
| DE | 101 11 279 A1 | 7/2002 |
| DE | 101 12 370 A1 | 9/2002 |
| DE | 20 2007 019 073 U1 | 6/2010 |
| DE | 10 2011 011 796 A1 | 10/2012 |
| EP | 0 761 908 B1 | 3/1997 |
| EP | 1 219 761 B1 | 7/2002 |
| EP | 1 983 128 B1 | 10/2008 |
| EP | 2 527 566 A1 | 11/2012 |
| FR | 2 612 999 A1 | 9/1988 |
| GB | 1 082 280 | 9/1967 |
| KR | 10 1999 0075681 | 10/1999 |
| WO | 02 066 768 A1 | 8/2002 |
| WO | 2012 136198 A1 | 10/2012 |

* cited by examiner

SCAFFOLDING PIPE OF A STRUCTURAL SCAFFOLDING SYSTEM AND SCAFFOLDING ELEMENT

CROSS-REFERENCE TO RELATED APPLICATIONS

This continuation application claims priority to PCT/EP2014/065753 filed on Jul. 22, 2014 which has published as WO 2015/014676 A1 and also the German application number 10 2013 108 326.9 filed on Aug. 2, 2013, the entire contents of which are fully incorporated herein with these references.

FIELD OF THE INVENTION

The invention relates to a scaffolding pipe of a structural scaffolding system having a pipe axis which extends from a first axial pipe end to an opposing second axial pipe end, a receiving portion which is provided on the first axial pipe end and an insertion portion which is provided on the second axial pipe end and which has a reduced cross-section compared with the receiving portion and terminates with a radial shoulder which forms an annular support face which is directed towards the insertion portion, the inner diameter of the receiving portion being greater than the outer diameter of the insertion portion so that an adjacent scaffolding pipe having an identical insertion portion can be inserted into the receiving portion. Furthermore, the invention also relates to a scaffolding element having such a scaffolding pipe.

BACKGROUND OF THE INVENTION

Structural scaffolding systems are constructed, for example, as operational scaffolding systems or load-bearing scaffolding systems. Scaffolding pipes are conventionally used in frame elements of a structural scaffolding system, in particular in operational scaffolding systems, and as individual posts when constructing load-bearing scaffolding systems or with so-called passage frames. In frame scaffolding systems, two parallel scaffolding pipes are connected to at least one transverse carrier, in particular welded. The frame elements are then fitted one on the other so that extreme scaffolding heights can be produced. However, scaffolding pipes are also constructed as individual rods. The principle of such structural scaffolding systems is substantially always the same. At an axial end of the scaffolding pipe, it has a reduced cross-section which forms the so-called insertion portion. At the opposite end, the receiving portion, the insertion portion of the adjacent scaffolding pipe can then be inserted, or vice versa. The insertion portion and the receiving portion have radial play with respect to each other in order to facilitate the insertion. However, this radial play is disadvantageous with respect to the stability of the scaffolding system since the upper scaffolding pipe can tilt readily relative to the lower scaffolding pipe. In order to reduce the maximum tilting angle, it is known to provide the complete receiving portion with axial longitudinal grooves which are formed by means of plastic deformation and which are peripherally spaced apart from each other. The radial play is thereby reduced. However, this advantage comes at the expense of the disadvantage that the insertion of the scaffolding pipes one into the other is no longer so easily possible and the pipes become more readily jammed or tilted during the construction or disassembly of scaffolding, in particular when a scaffolding pipe of a frame element is inserted significantly before the other scaffolding pipe of the frame element.

The object of the invention is therefore to provide a scaffolding pipe which enables simple and rapid construction and disassembly of a structural scaffolding system with a high degree of scaffolding stability.

SUMMARY OF THE INVENTION

The objects are achieved according to the invention by a scaffolding pipe of the type mentioned in the introduction, a pipe wall of the scaffolding pipe having at the first axial pipe end a maximum wall thickness $s_{max}$ and otherwise, i.e. in all other areas, a smaller wall thickness s. This radially expanded, thickened pipe wall at the first axial pipe end increases a contact face between the front side of the scaffolding pipe, which side is formed by the thickened portion, and the adjacent support face at the radial shoulder of an inserted additional scaffolding pipe. In this instance, the contact face also forms, in the event of a radial relative displacement of the pipes which are inserted one inside the other, a wide annular face which is continuous in a peripheral direction. Consequently, in the case of a material requirement which is increased only by a minimal amount, there are produced a more uniform pressure distribution and smaller surface pressures at the first axial pipe end.

In contrast, the front face of the receiving portion can be displaced relative to the support face of the radial shoulder in the prior art in such a manner that the contact face is reduced, whereby the pipes at the front side are subjected to greater loads and consequently have a smaller load-bearing capacity and can be more readily plastically deformed.

In a preferred method, the thickening of the pipe wall at the first axial pipe end is carried out by means of an upsetting deformation of the scaffolding pipe, which leads to a plastic expansion of the pipe wall in a radial direction.

Preferably, the following applies to the maximum wall thickness $s_{max}$ at the first axial pipe end: $1.2*s \leq s_{max} \leq 2*s$, in particular $s_{max} \approx 1.5*s$, where s designates the substantially constant wall thickness of the scaffolding pipe outside the pipe wall thickening at the first axial pipe end.

In a particularly preferred manner, an outer diameter of the scaffolding pipe at the first axial end substantially corresponds to the outer diameter of the receiving portion. In other words, this means that the first axial pipe end expands radially inwards, whilst a radial outer side of the scaffolding pipe in the region of the first axial pipe end remains substantially cylindrical, in particular circular-cylindrical. The thickened pipe wall thus not only provides a large front face, but further also ensures contact which is as extensive as possible between this front face and the support face of the inserted scaffolding pipe.

At the first axial pipe end of the scaffolding pipe, there is preferably provided a thickened portion, in which the pipe wall is thickened in a substantially wedge-like manner from the smaller wall thickness s to the maximum wall thickness $s_{max}$.

The thickened portion may in particular have an axial dimension $L_A$, where: $s < L_A < 5*s$, in particular $L_A \approx 2.5*s$, where s again designates the substantially constant wall thickness of the scaffolding pipe outside the pipe wall thickened portion at the first axial pipe end.

The above-mentioned object is also achieved according to the invention by a scaffolding pipe of the type mentioned in the introduction, in which the receiving portion at the first axial pipe end has precisely one positioning groove which is interrupted or continuous in a peripheral direction and which reduces the inner diameter $d_{1,i}$ of the receiving portion and defines the minimum inner diameter $d_{1,i,min}$ of the receiving portion.

The invention provides an excellent compromise between small radial play and simple insertion of adjacent scaffolding pipes one inside the other. Owing to the formed positioning groove, the receiving portion has at the first axial pipe end a minimum inner diameter which significantly reduces the radial play with respect to conventional, non-shaped scaffolding pipes. However, the receiving portion again has, axially downstream of the positioning groove towards the radial shoulder, an inner diameter which is increased with respect to the minimum inner diameter so that the scaffolding pipe to be inserted can still be tilted to a significant degree after the tip of the insertion portion has just left the region of the positioning groove. Since the scaffolding pipes which are intended to be inserted one in the other at the beginning of the insertion operation can be tilted with respect to each other in a very simple manner and to a significant degree, undesirable jamming or tilting of the scaffolding pipes is substantially impossible. However, the deeper the tip of the insertion portion, that is to say, the second axial pipe end, penetrates into the receiving portion, the greater the spacing also is between the two abutment faces which are produced, that is to say, on the one hand, the abutment face between the tip of the insertion portion and the inner side of the receiving portion and, on the other hand, the abutment face between the positioning groove and the adjacent region of the insertion portion. As the axial spacing between the abutment faces increases, the maximum tilting angle permitted by the radial play at the tip of the insertion portion becomes increasingly small.

Since the radial positioning of the inserted scaffolding pipe is carried out merely by means of a single positioning groove, the radial play, that is to say, a gap between the outer diameter of the insertion portion and the minimum inner diameter of the receiving portion defined by the positioning groove can be reduced with respect to conventional structural scaffolding systems without the complexity for the assembly or disassembly of the structural scaffolding system increasing significantly. This is because the precisely one positioning groove enables first a significant degree of tilting when two scaffolding pipes are inserted one inside the other so that assembly-friendly construction and disassembly of the structural scaffolding system is ensured, even with little radial play. In the assembled state of the scaffolding pipes, the small radial play then advantageously acts on the stability and load-bearing capacity of the structural scaffolding system.

In an embodiment of the scaffolding pipe, the insertion portion has from the second axial pipe end to the radial shoulder an axial insertion length, an axial spacing of the positioning groove from the first axial pipe end being smaller than a third, in particular smaller than a fifth, of the axial insertion length.

Furthermore, the axial spacing of the positioning groove from the first axial pipe end may also be smaller than the inner diameter of the receiving portion. Owing to the axial arrangement of the positioning groove very close to the first axial pipe end, at the beginning of the insertion operation tilting of the scaffolding pipes is readily possible for simple assembly or disassembly. At the same time, in the joined-together state, the scaffolding pipes are fixed to each other with little radial play as a result of the proximity of the positioning groove with respect to the first axial pipe end, and consequently to the support face of the scaffolding pipe.

This fixing with little play close to the support face leads to a high axial load-bearing capacity and stability of the scaffolding pipe connection.

In another embodiment of the scaffolding pipe, the receiving portion has a groove which is interrupted or continuous in a peripheral direction, this groove having a larger axial spacing with respect to the first axial pipe end than the positioning groove and defining an inner diameter $d_{1,i,N}$ to which the following applies: $d_{1,i,min} < d_{1,i,N} < d_{1,i}$. Owing to this groove which is provided in addition to the positioning groove, at the end of the insertion operation of two scaffolding pipes, specifically when the tip of the insertion portion of one scaffolding pipe reaches the groove in the receiving portion of the other scaffolding pipe, a possible tilting angle of the two scaffolding pipes relative to each other is reduced. This increases the stability and load-bearing capacity of the assembled structural scaffolding system, but has hardly any effect on the ease of assembly during construction or disassembly of the structural scaffolding system since the tilting angle reduction is only evident at the end of the insertion operation and in the inserted state. It should be emphasized that the insertion portion of the inserted scaffolding pipe in the region of the positioning groove has a smaller radial play than at the optional additionally provided groove.

The insertion portion of the scaffolding pipe has in this instance from the second axial pipe end to the radial shoulder an axial insertion length $L_E$, the following preferably applying to an axial spacing $x_N$ of the groove with respect to the first axial pipe end: $0.5*L_E < x_N < L_E$, in particular $x_N \approx 0.8*L_E$. The reduction of the tilting angle is thereby carried out only at the end of the insertion operation so that the easy-to-assemble construction of the structural scaffolding system is hardly influenced. Furthermore, the largest possible axial spacing between the positioning groove and the additional groove is particularly advantageous with respect to the largest possible tilting angle reduction.

In another embodiment, the scaffolding pipe has between the receiving portion and the insertion portion an intermediate region in which the scaffolding pipe preferably has the same outer diameter $d_{1,a}$ and the same shape as in the receiving portion. This intermediate region is used for the longitudinal construction of the scaffolding pipe. Whilst the receiving portion has the same axial length as the insertion portion, the required axial length of the scaffolding pipe can be achieved via the intermediate region.

The intermediate region may have adjacent to the radial shoulder in particular an expansion portion, in which the scaffolding pipe expands radially towards the radial shoulder. An increased support face is thereby produced on the radial shoulder of the scaffolding pipe so that it is ensured that the front face on the first axial pipe end of the fitted scaffolding pipe is always completely load-bearing.

In particular, the annular support face of the scaffolding pipe may have an outer diameter $d_{3,a}$ which is greater than the outer diameter $d_{1,a}$ of the receiving portion.

In another embodiment of the scaffolding pipe, the insertion portion adjacent to the radial shoulder has a contraction which extends in the peripheral direction so that the annular support face has an inner diameter $d_{3,i}$ which is smaller than the outer diameter $d_{2,a}$ of the insertion portion.

Preferably, the insertion portion tapers towards the second axial end of the scaffolding pipe and forms a tapered introduction portion. This tapered introduction portion is produced, for example, by means of plastic pipe deformation and facilitates the insertion of the insertion portion into the receiving portion of an additional scaffolding pipe since the region of the insertion portion to be introduced, that is to say, the second axial pipe end, forms a type of tip.

The wall thickness of the scaffolding pipe is preferably a maximum of 3.2 mm with an operational scaffolding system, in particular 2.7 mm. This is a particularly small wall thickness for a scaffolding pipe, which accordingly has an advantageous effect on the weight thereof. The small wall thickness can be produced since the stability of the scaffolding pipe or the structural scaffolding system is ensured by means of the positioning groove and/or the thickened pipe wall on the first axial pipe end of the scaffolding pipe. Owing to the smaller wall thickness of the scaffolding pipe, weight is saved which in turn facilitates the construction and disassembly of the structural scaffolding system. The same also applies to load-bearing scaffolding systems which currently have conventional wall thicknesses of at least 3.2 mm. This wall thickness may be reduced in particular to approximately 2.9 mm, or alternatively remain unchanged, whereby the load-bearing capacity of the scaffolding is significantly increased.

The invention further comprises a scaffolding element which comprises at least one above-mentioned scaffolding pipe and a transverse carrier which is securely fitted to the scaffolding pipe, the transverse carrier preferably being arranged and secured perpendicularly relative to the scaffolding pipe on the receiving portion or on an intermediate region of the scaffolding pipe. The at least one load-bearing transverse carrier is preferably arranged on the receiving portion or on the intermediate region since this is the stabilizing region of the scaffolding pipe according to the invention. Such a scaffolding element may, for example, be an angled element which is used to expand the operating face during construction of the scaffolding, or a frame element.

In particular, the scaffolding element may comprise two of the above-mentioned scaffolding pipes which are connected to each other by means of the at least one transverse carrier in order to form a frame element of the structural scaffolding system. A frame element which is constructed in this manner is typically known as an H element or a T element and is used during scaffolding construction in order to form the side walls of the structural scaffolding system in a rapid and efficient manner.

BRIEF DESCRIPTION OF THE DRAWINGS

Other features and advantages of the invention will be appreciated from the following description of preferred embodiments and with reference to the drawings, in which.

DETAILED DESCRIPTION OF THE PREFERRED EMBODIMENTS

FIGS. 1 to 4 show scaffolding pipes 10 for a structural scaffolding system, which pipes may be constructed as rods or members of a scaffolding element, for example, a frame element which is shown later. Each scaffolding pipe 10 comprises a pipe axis A which extends from a first axial pipe end 12 to an opposed second axial pipe end 14, a receiving portion 16 which is provided on the first axial pipe end 12 and an insertion portion 18 which is provided on the second axial pipe end 14 and which has a smaller outer cross-section than the remaining portions of the scaffolding pipe 10.

An inner diameter $d_{1,i}$ of the receiving portion 16 is larger than an outer diameter $d_{2,a}$ of the insertion portion 18 so that an adjacent scaffolding pipe 10 having an identical insertion portion 18 can be inserted into the receiving portion 16.

An intermediate region 20 connects the receiving portion 16 to the insertion portion 18, the intermediate region 20 preferably merging in a stepless manner with the same geometry and the same dimensions into the receiving portion 16.

The intermediate region 20 is connected in an integral manner to the insertion portion 18 by means of a radial shoulder 22. The radial shoulder 22 has a support face 24 which is directed towards the insertion portion 18 and which acts as a stop when two scaffolding pipes 10 are inserted one inside the other.

The entire scaffolding pipe 10 is preferably produced in an integral manner from a metal pipe, and the various portions are simply formed by means of plastic deformation of the scaffolding pipe 10.

Figures 1, 2:
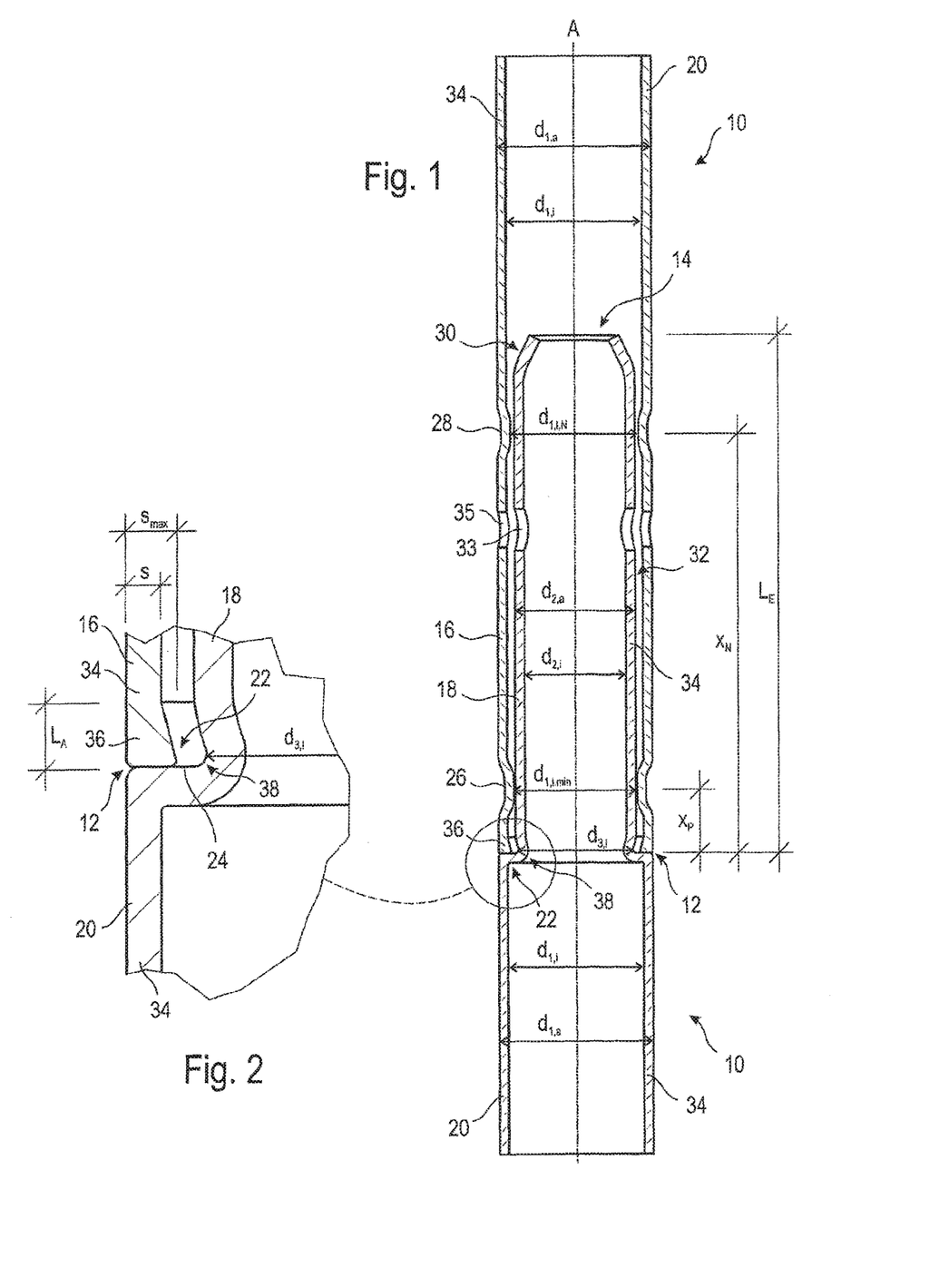
FIG. 1 is a longitudinal section through two scaffolding pipes according to the invention which are inserted one inside the other according to a first embodiment.
FIG. 2 is a detailed cut-out of FIG. 1 in the region of a first axial pipe end.
Figures 3, 4:
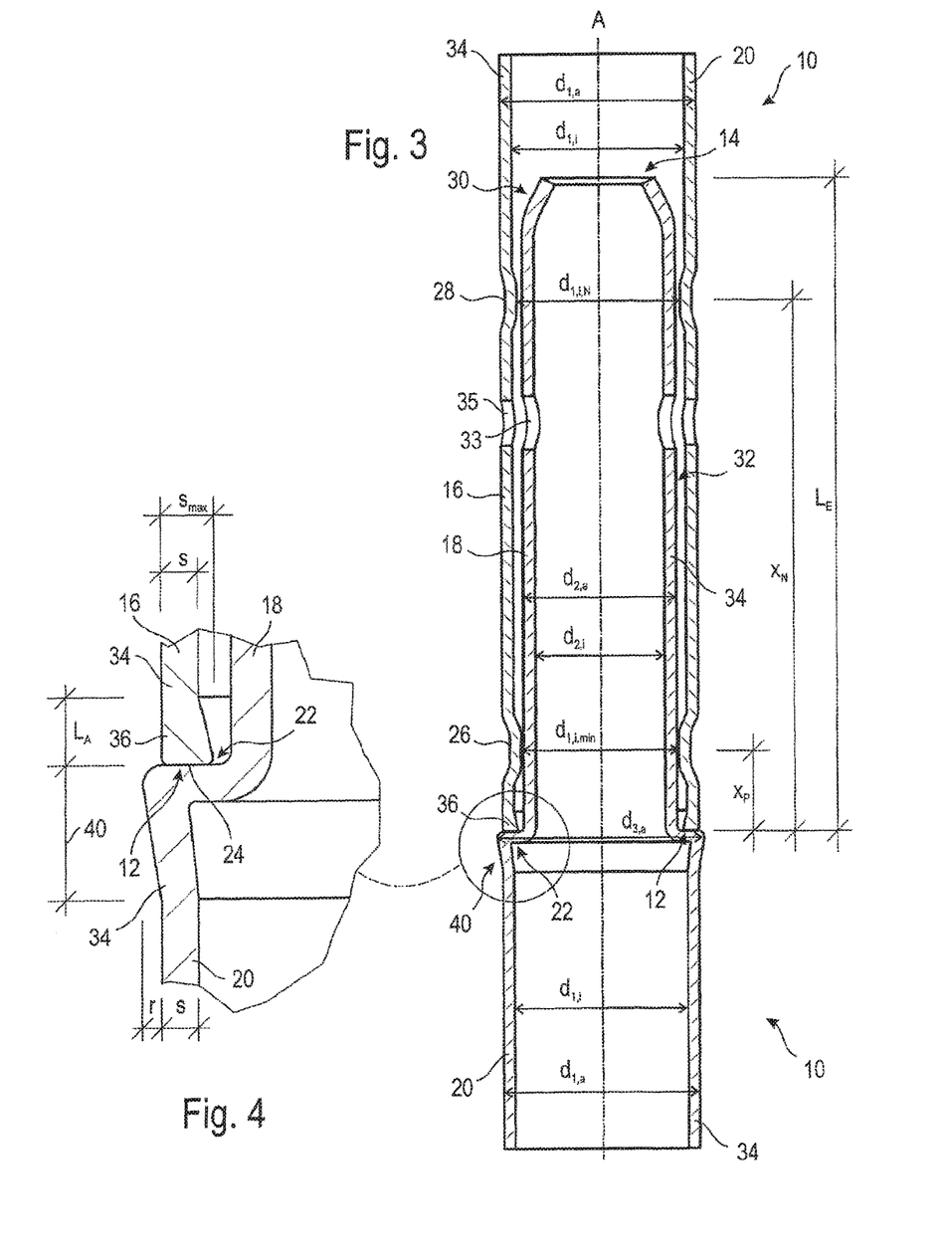
FIG. 3 is a longitudinal section through two scaffolding pipes according to the invention which are inserted one inside the other according to a second embodiment.
FIG. 4 is a detailed cut-out of FIG. 3 in the region of a first axial pipe end.

According to FIGS. 1 and 3, the receiving portion 16 has at the first axial pipe end 12 precisely one positioning groove 26 which is interrupted or continuous in the peripheral direction and which reduces the inner diameter $d_{1,i}$ of the receiving portion 16. A minimum inner diameter $d_{1,i,min}$ of the receiving portion 16 is defined in this instance only by the precisely one positioning groove 26.

This minimum inner diameter $d_{1,i,min}$ of the receiving portion 16 defined by the positioning groove 26 is only slightly larger than the outer diameter $d_{2,a}$ of the insertion portion 18 so that two scaffolding pipes 10 which have been joined together in the region of the positioning groove 26 are connected in a radial direction in an almost play-free manner. This connection of the scaffolding pipes 10 which are inserted one inside the other with little radial play leads to a high degree of stability and load-bearing capacity of the structural scaffolding system.

Since the receiving portion 16 has only a single positioning groove 26 which defines the minimum inner diameter $d_{1,i,min}$, at the beginning of the insertion operation of two scaffolding pipes 10 a very high degree of tilting of the scaffolding pipes 10 is still possible so that, in spite of the small radial play in the region of the positioning groove 26, a simple assembly and disassembly of the structural scaffolding system are produced.

In order to enable a particularly large tilting angle at the beginning of the insertion operation of two scaffolding pipes 10 and to fix to each other the scaffolding pipes 10 which have been inserted one inside the other in the region of the first axial pipe end 12 in the most radially play-free manner possible, it is advantageous for the positioning groove 26 to be arranged as close as possible to the first axial pipe end 12. However, the positioning groove 26 is spaced so far apart from the first axial pipe end 12 that the radial outer diameter $d_{1,a}$ of the receiving portion 16 is no longer reduced by the positioning groove 26. The diameter of an annular front face that forms the support face at the first axial pipe end 12 is consequently not reduced by the positioning groove 26, which has a positive effect on the stability and load-bearing capacity of the structural scaffolding system.

The insertion portion 18 has from the second axial pipe end 14 to the radial shoulder 22 an axial insertion length $L_E$, it having been found to be particularly advantageous for an axial spacing $x_P$ of the positioning groove 26 from the first axial pipe end 12 to be smaller than a third, in particular smaller than a fifth, of the axial insertion length $L_E$. The insertion length $L_E$ is preferably in a range from approximately 150 mm to 250 mm.

With respect to the inner diameter $d_{1,i}$ of the receiving portion 16, it has been found to be particularly advantageous for the axial spacing $x_P$ of the positioning groove 26 from the first axial pipe end 12 to be smaller than the inner diameter $d_{1,i}$ of the receiving portion 16.

As illustrated in FIGS. 1 and 3, the receiving portion 16 has another groove 28 which is interrupted or continuous in the peripheral direction, this groove 28 having with respect to the first axial pipe end 12 a larger axial spacing $x_N$ than the positioning groove 26 and further defining an inner diameter $d_{1,i,N}$ where: $d_{1,i,min} < d_{1,i,N} < d_{1,i}$. This means in other words that the optional groove 28 has a larger radial play with respect to the insertion portion 18 of an inserted scaffolding pipe 10 than the positioning groove 26. The groove 28 serves only to reduce the tilting angle at the end of the insertion operation and in the joined-together state of two scaffolding pipes 10, which has an advantageous effect on the stability and load-bearing capacity of the structural scaffolding system, but which has hardly any disadvantageous effect on the ease of assembly thereof.

A particularly great tilting angle reduction can be produced when the groove 28 in an axial direction is arranged with the greatest possible spacing from the positioning groove 26. With respect to the axial insertion length $L_E$ of the insertion portion 18, it has been found to be particularly advantageous if the following applies to an axial spacing $x_N$ of the groove 28 from the first axial pipe end 12: $0.5*L_E < x_N < L_E$, in particular $x_N \approx 0.8*L_E$.

The insertion portion 18 has a tapering free end. The cross-section of the insertion portion 18 is reduced to such an extent that the outer diameter $d_{2,a}$ of the insertion portion 18 is smaller than the inner diameter $d_{1,i,min}$ of the receiving portion 16 in the region of the positioning groove 26. It is consequently ensured that the insertion portion 18 of a first scaffolding pipe 10 can be inserted into the receiving portion 16 of an identical second scaffolding pipe 10.

According to FIGS. 1 and 3, the insertion portion 18 of the scaffolding pipe 10 tapers in the direction towards the second axial pipe end 14 and forms a tapered introduction portion 30. The tapered introduction portion 30 is adjoined axially by a cylindrical introduction portion 32 having a substantially constant, circular-cylindrical cross-section.

In production variants of the scaffolding pipe 10 having such a tapered introduction portion 30, it should be ensured that the optional groove 28 in the joined-together state of two scaffolding pipes 10 radially adjoins the cylindrical introduction portion 32 and not the tapered introduction portion 30, since otherwise no tilting angle reduction is produced by the groove 28.

Furthermore, the scaffolding pipe 10 has on the insertion portion 18 an opening 33 (see FIGS. 1 and 3) which is provided for a securing pin which additionally secures the connection after two scaffolding pipes 10 have been joined together. The receiving portion 16 has a corresponding opening 35 which is in alignment with the opening 33 so that the securing pin can be inserted through the two openings 33, 35.

In particular with reference to the section details in FIGS. 2 and 4, it can be clearly seen that a pipe wall 34 of the scaffolding pipe 10 on the first axial pipe end 12 has a maximum wall thickness $s_{max}$ and further has a substantially constant smaller wall thickness s.

In the embodiments illustrated, the thickened portion of the pipe wall 34 at the first axial pipe end 12 was achieved by means of an upsetting deformation of the scaffolding pipe 10 in a radially inward direction so that an outer diameter $d_{1,a}$ of the scaffolding pipe 10 at the first axial pipe end 12 substantially corresponds to the outer diameter $d_{1,a}$ of the receiving portion 16. With the exception of the positioning groove 26 and the optionally provided groove 28, the receiving portion 16 consequently retains a constant substantially circular-cylindrical outer cross-section.

According to FIGS. 2 and 4, the scaffolding pipe 10 has at the first axial pipe end 12 a thickened portion 36 in which the pipe wall 34 is thickened in a substantially wedge-like manner from the smaller wall thickness s to the maximum wall thickness $s_{max}$, where the following applies to an axial dimension $L_A$ of the thickened portion 36: $s < L_A < 5*s$, in particular $L_A \approx 2*s$, where s designates (with the exception of the thickened portion 36) the substantially constant wall thickness of the scaffolding pipe 10.

With regard to this wall thickness s of the scaffolding pipe 10, the following applies to the maximum wall thickness $s_{max}$ at the first axial pipe end 12: $1.2*s \leq s_{max} \leq 2*s$, in particular $s_{max} \approx 1.5*s$.

FIGS. 1 and 2 show scaffolding pipes 10 according to a first embodiment, in which the insertion portion 18 adjacent to the radial shoulder 22 has a contraction 38 which extends in a peripheral direction so that the annular support face 24 has an inner diameter $d_{3,i}$ which is smaller than the outer diameter $d_{2,a}$ of the insertion portion 18.

In contrast, FIGS. 3 and 4 show scaffolding pipes 10 according to a second embodiment which is, however, very similar in terms of structure and function to the first embodiment so that only differences will be discussed below.

In a modification of the first embodiment, the scaffolding pipes 10 according to FIGS. 3 and 4 have adjacent to the radial shoulder 22 no contraction 38 which extends in a peripheral direction so that the inner diameter $d_{3,i}$ of the support face 24 substantially corresponds to the outer diameter $d_{2,a}$ of the insertion portion 18.

Instead, the annular support face 24 of the scaffolding pipe 10 according to FIGS. 3 and 4, in contrast to the first embodiment, has an outer diameter $d_{3,a}$ which is greater than the outer diameter $d_{1,a}$ of the receiving portion 16.

This is achieved by the intermediate region 20 of the scaffolding pipe 10 adjacent to the radial shoulder 22 having a conical expansion portion 40 in which the scaffolding pipe 10 radially expands in the direction towards the radial shoulder 22.

With regard to the wall thickness s, the following applies to an expansion r of the expansion portion 40: $0.2*s \leq r \leq s$, in particular $r \approx 0.5*s$. Owing to the radial expansion r of the intermediate region 20, it is ensured that, when scaffolding pipes 10 are joined together, an optionally expanded front face of the first axial pipe end 12 is always in abutment with the support face 24 over the complete surface-area. Excessive surface pressure and non-uniform pressure distributions are thereby substantially prevented.

Scaffolding pipes 10 according to FIGS. 1 to 4 may also be provided with scaffolding elements. These scaffolding elements are, for example, frame elements (see FIG. 5) or angled elements which in addition to the scaffolding pipe 10 have a transverse carrier 42 or a carrier which is constructed in another manner. These carriers are welded to the scaffolding pipe(s) 10, in particular to the receiving portion 16 or intermediate portion 20 thereof.

Figure 5:
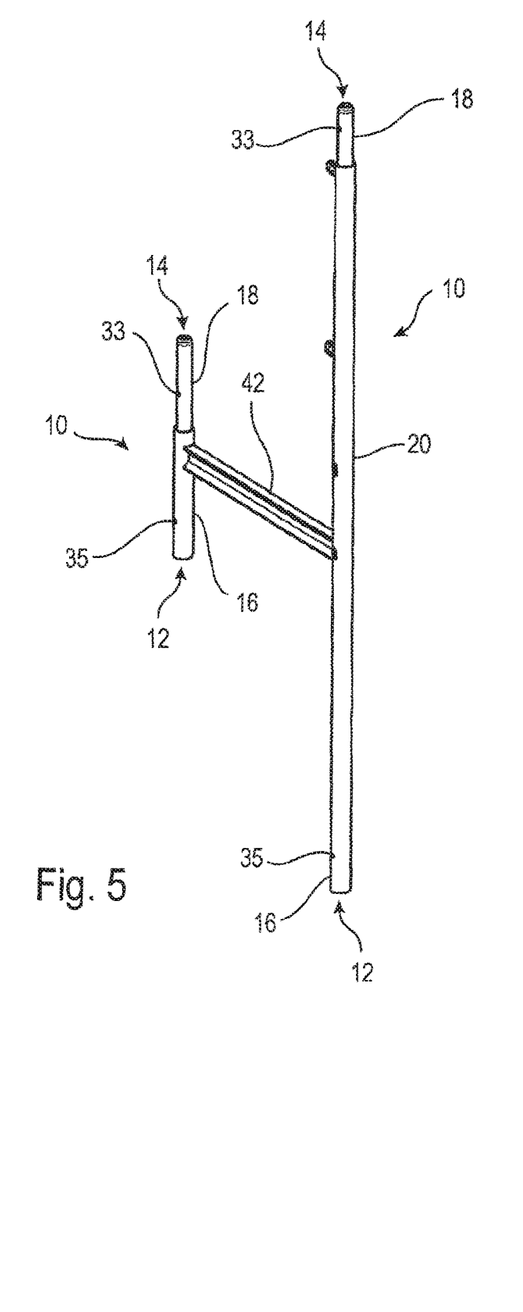
FIG. 5 is a perspective view of a scaffolding element according to the invention with two scaffolding pipes according to the invention.

In the embodiment according to FIG. 5, two scaffolding pipes 10 having different lengths are connected to each other by means of a transverse carrier 42 which is welded on in each case, with a scaffolding element being formed. Both scaffolding pipes 10 have in this case insertion portions 18 which are located at the same side and corresponding receiving portions 16 at the opposing ends thereof. An intermediate pipe may optionally be fitted on the shorter scaffolding pipe 10.

Alternatively, the scaffolding pipe 10 may also be used for an angled element according to the invention.

Apart from the thickened portion 36, the wall thickness s of the non-deformed scaffolding pipe 10 for an operational scaffolding system is a maximum of 3.2 mm, in particular approximately 2.7 mm, which is less than the wall thickness of conventional scaffolding pipes. Consequently, the scaffolding pipes 10 according to the invention are lighter and accordingly have advantages in terms of handling.

FIG. 5 illustrates a portion of an operational scaffolding system which is arranged beside a construction site and which is walked on by workers.

Figure 6:
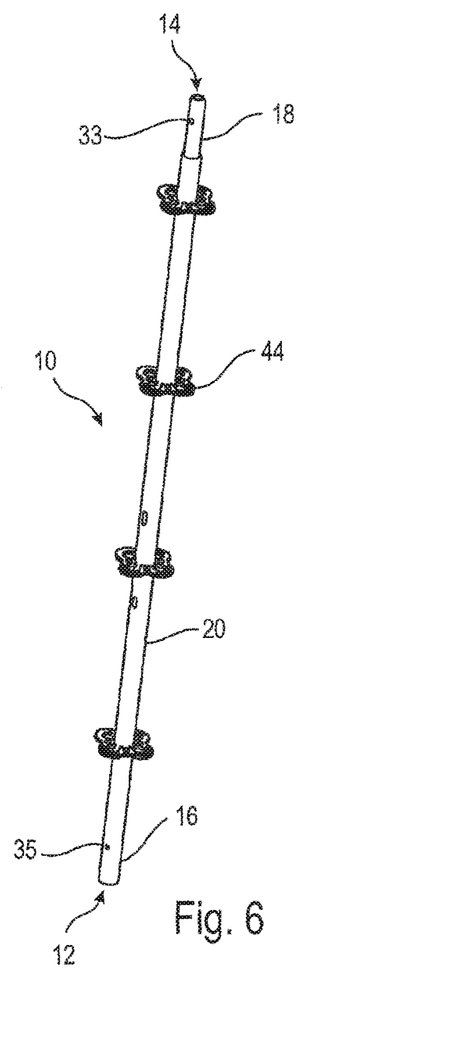
FIG. 6 is a perspective view of a scaffolding pipe according to the invention, in this instance for a modular scaffolding system.

Alternatively, the scaffolding pipe 10 may also be part of a modular scaffolding system, as illustrated in FIG. 6. FIG. 6 specifically shows a scaffolding pipe 10 which is constructed as a carrier pipe and which, for example, carries a formwork for a ceiling. This scaffolding pipe 10 is also constructed as described above and illustrated with reference to FIGS. 1 to 4. Apart from the thickened portion 36, the wall thickness s of such a scaffolding pipe 10 for load-bearing scaffolding systems is preferably between 2.7 mm and 3.2 mm, although this is not intended to be understood to be limiting, and is consequently smaller than the wall thickness of conventional pipes for load-bearing scaffolding systems.

Round securing plates 44 which are optionally provided and fitted to the scaffolding pipe 10 serve to secure adjacent scaffolding components.

LIST OF REFERENCE NUMERALS

10 Scaffolding pipes
12 First axial pipe end
14 Second axial pipe end
16 Receiving portion
18 Insertion portion
20 Intermediate region
22 Shoulder
24 Support face
26 Positioning groove
28 Groove
30 Tapered introduction portion
32 Cylindrical introduction portion
33 Opening
34 Pipe wall
35 Opening
36 Expansion portion
38 Contraction
40 Expansion portion
42 Transverse carrier
44 Round securing plates

What is claimed is:

1. A scaffolding pipe of a structural scaffolding system, comprising:
   a pipe axis A which extends from a first axial pipe end to an opposing second axial pipe end;
   a receiving portion which is provided on the first axial pipe end;
   an insertion portion which is provided on the opposing second axial pipe end and which has a reduced cross-section compared with the receiving portion where the reduced cross-section terminates with a radial shoulder which forms an annular support face which is perpendicular to the pipe axis A and is directed towards the insertion portion;
   wherein an inner diameter $d_{1,i}$ of the receiving portion is greater than an outer diameter $d_{2,a}$ of the insertion portion so that an adjacent scaffolding pipe having an identical insertion portion can be inserted into the receiving portion of the scaffolding pipe wherein the first axial pipe end is configured to abut an identical annular support face of the adjacent scaffolding pipe;
   wherein a pipe wall of the scaffolding pipe at a furthest end of the first axial pipe end has a maximum wall thickness $s_{max}$ and otherwise has a smaller wall thickness s moving towards the opposing second axial pipe end;
   wherein the scaffolding pipe is produced in one piece from a metal pipe, and wherein the various portions are formed by plastic deformation; and
   wherein the first axial pipe end has an outer diameter $d_{1,a}$ and wherein the insertion portion has from the second axial pipe end to the radial shoulder an axial insertion length $L_E$, wherein the axial insertion length $L_E$ is at least two times the length in comparison to the outer diameter $d_{1,a}$.

2. The scaffolding pipe according to claim 1, wherein the following applies to the maximum wall thickness $s_{max}$ at the first axial pipe end: $1.2*s \leq s_{max} 2*s$.

3. The scaffolding pipe according to claim 2, wherein the maximal wall thickness $s_{max}$ is equal to 1.5 times the smaller wall thickness s.

4. The scaffolding pipe according to claim 1, wherein the outer diameter $d_{1,a}$ of the scaffolding pipe at the first axial pipe end substantially corresponds to the outer diameter $d_{1,a}$ of the receiving portion.

5. The scaffolding pipe according to claim 1, wherein the scaffolding pipe has at the first axial pipe end a thickened portion in which the pipe wall is thickened in a substantially wedge-like manner from the smaller wall thickness s to the maximum wall thickness $s_{max}$.

6. The scaffolding pipe according to claim 5, wherein the thickened portion has an axial dimension $L_A$, where $s < L_A < 5*s$.

7. The scaffolding pipe according to claim 6, wherein the thickened portion has an axial dimension $L_A$, where $L_A$ is approximately $2.5*s$.

8. The scaffolding pipe according to claim 1, wherein the receiving portion at the first axial pipe end has a positioning groove which is interrupted or continuous in a peripheral direction and which reduces the inner diameter $d_{1,i}$ of the receiving portion and defines a minimum inner diameter $d_{1,i,min}$ of the receiving portion.

9. The scaffolding pipe according to claim 8, wherein the insertion portion has from the second axial pipe end to the radial shoulder the axial insertion length $L_E$, an axial spacing $x_p$ of the positioning groove from the first axial pipe end being smaller than a third of the axial insertion length $L_E$.

10. The scaffolding pipe according to claim 8, wherein the insertion portion has from the second axial pipe end to the radial shoulder the axial insertion length $L_E$, and an axial spacing $x_p$ of the positioning groove from the first axial pipe end being smaller than a fifth of the axial insertion length $L_E$.

11. The scaffolding pipe according to claim 8, wherein an axial spacing $x_p$ of the positioning groove from the first axial pipe end is smaller than the inner diameter $d_{1,i}$ of the receiving portion.

12. The scaffolding pipe according to claim 8, wherein the receiving portion has a second groove which is interrupted or continuous in a peripheral direction, this second groove having a larger axial spacing $x_N$ with respect to the first axial pipe end than the positioning groove, the second groove defining an inner diameter $d_{1,i,N}$ to which the following applies: $d_{1,i,min} < d_{1,i,N} < d_{1,i}$.

13. The scaffolding pipe according to claim 12, wherein the insertion portion from the second axial pipe end to the radial shoulder has the axial insertion length $L_E$, the following applying to an axial spacing $x_N$ of the groove with respect to the first axial pipe end: $0.5 \ast L_E < x_N < L_E$.

14. The scaffolding pipe according to claim 13, wherein the insertion portion from the second axial pipe end to the radial shoulder has the axial insertion length $L_E$, where $x_N$ is approximately equal to $0.8 \ast L_E$.

15. The scaffolding pipe according to claim 1, wherein the scaffolding pipe has between the receiving portion and the insertion portion an intermediate region in which the scaffolding pipe has the same outer diameter $d_{1,a}$ as in the receiving portion.

16. The scaffolding pipe according to claim 15, wherein the intermediate region has adjacent to the radial shoulder an expansion portion, in which the scaffolding pipe expands radially towards the radial shoulder.

17. The scaffolding pipe according to claim 1, wherein the annular support face has an outer diameter $d_{3,a}$ which is greater than the outer diameter $d_{1,a}$ of the receiving portion.

18. The scaffolding pipe according to claim 1, wherein the insertion portion adjacent to the radial shoulder has a contraction which extends in the peripheral direction so that the annular support face has an inner diameter $d_{3,i}$ which is smaller than the outer diameter $d_{2,a}$ of the insertion portion.

19. The scaffolding pipe according to claim 1, wherein the insertion portion tapers towards the second axial pipe end and forms a tapered introduction portion.

20. The scaffolding pipe according to claim 1, wherein the scaffolding pipe is part of an operational scaffolding system and the wall thickness s of the scaffolding pipe is a maximum of 3.2 mm, or is part of a load-bearing scaffolding system and the wall thickness s of the scaffolding pipe is from 2.7 mm to 3.2 mm.

21. A scaffolding element comprising a scaffolding pipe according to claim 1, the scaffolding element including a transverse carrier which is securely fitted to the scaffolding pipe, the transverse carrier being arranged perpendicularly relative to the scaffolding pipe on the receiving portion or on an intermediate region of the scaffolding pipe.

22. The scaffolding element according to claim 21, wherein there are provided two scaffolding pipes which are connected to each other by means of the at least one transverse carrier in order to form a frame element of the structural scaffolding system.

* * * * *